United States Patent [19]

Yard et al.

[11] Patent Number: 4,957,005

[45] Date of Patent: Sep. 18, 1990

[54] CORIOLIS-TYPE FLOWMETER

[75] Inventors: John Yard, Doylestown; Warren O. Strohmeier, Warminster, both of Pa.

[73] Assignee: Fischer & Porter Company, Warminster, Pa.

[21] Appl. No.: 417,692

[22] Filed: Oct. 5, 1989

[51] Int. Cl.⁵ ............................................. G01F 1/84
[52] U.S. Cl. ................................................. 73/861.38
[58] Field of Search ........................ 73/861.37, 861.38

[56] References Cited

U.S. PATENT DOCUMENTS

| | | | |
|---|---|---|---|
| 4,733,569 | 3/1988 | Kelsey | 73/861.38 |
| 4,747,312 | 5/1988 | Herzl | 73/861.38 |
| 4,763,530 | 8/1988 | Mizeran | 73/861.38 |

FOREIGN PATENT DOCUMENTS 0275620 12/1986 Japan.
0290324 12/1986 Japan.

Primary Examiner—Herbert Goldstein
Attorney, Agent, or Firm—Michael Ebert

[57] ABSTRACT

A mass flowmeter of the Coriolis-type in which fluid to be metered is conducted through a flow tube which is coiled to define a helix having a pair of identical measuring loops forming a double loop, on either side of which is an isolation loop. The fluid is admitted into the input of one isolation loop and is discharged from the output of the other isolation loop. The helix is concentric with a support structure having at one end a flow inlet to which the isolation loop input is affixed, and at the other end a flow outlet to which the isolation loop output is attached. A rigid bar parallel to the axis of the helix is joined to the junction of the measuring loops as well as to the respective junctions of each measuring loop and its associated isolation loop whereby the isolation loops then function as decoupling springs to effectively isolate the bar and the double measuring loop from external forces.

11 Claims, 2 Drawing Sheets

CORIOLIS-TYPE FLOWMETER

BACKGROUND OF INVENTION

1. Field of Invention:

This invention relates generally to mass flowmeters, and more particularly to a Coriolis-type meter in which the fluid to be metered is conducted through a helically coiled flow tube that includes a double loop that functions as a tuning fork whose tines are free to vibrate in phase opposition so as to torsionally oscillate as a function of mass flow.

2. Status of Prior Art:

A mass flow rate meter is an instrument for measuring the mass of a fluid flowing through a conduit per unit time. Most meters for this purpose measure a quantity from which the mass can be inferred, rather than measuring mass directly. Thus, one can measure the mass flow rate with a volumetric flowmeter by also taking into account pressure, temperature and other parameters to compute the mass.

A Coriolis-type mass flowmeter provides an output directly proportional to mass flow, thereby obviating the need to measure pressure, temperature, density and other parameters. In this type of meter, there are no obstacles in the path of the flowing fluid, and the accuracy of the instrument is unaffected by erosion, corrosion or scale build-up in the flow sensor.

In the Roth U.S. Pat. No. 3,132,512, a Coriolis-type mass flowmeter is disclosed in which a flow loop vibrating at its resonance frequency is caused to oscillate about a torque axis which varies with fluid flow in the loop. This torsional oscillation is sensed by moving coil transducers.

The Cox et al. U.S. Pat. Nos. 4,127,828 and 4,192,184 show a Coriolis-type meter having two U-shaped flow loops arranged to vibrate like the tines of a tuning fork, torsional oscillation of these loops in accordance with the mass of the fluid passing therethrough being sensed by light detectors. In the Smith U.S. Pat. No. 4,222,338, electromagnetic sensors provide a linear analog signal representing the oscillatory motion of a U-shaped pipe. Electromagnetic sensors are also used in the Smith et al., U.S. Pat. No. 4,492,025, in which the fluid whose mass is to be measured flows serially through two parallel U-shaped pipes which together operate as the tines of a tuning fork.

Because a double-loop Coriolis-type meter functions as a tuning fork, the minimum power required to oscillate the two loops occurs at their natural frequency. When the two loops vibrate as a tuning fork with respect to an anchor at the junction of the two loops, they will alternately draw together to a minimum spacing and then separate to a maximum spacing; hence the angular velocity vector for one loop will always be opposite to the angular velocity vector for the other loop. And because the flow through the two loops is the same, the loops will be subjected to opposing torques by reason of the opposite angular velocity vectors. As a consequence, the two loops are caused alternately to twist toward and away from each other.

A double-loop tuning fork configuration also provides a more stable operation than two single loops in parallel relation, for the mass flow is common to both loops and does not depend on evenly splitting the flow between the two loops. This results in a dynamically balanced pair of loops and a substantially decreased sensitivity to external vibratory forces.

However, because the loops of the tuning fork are anchored at their center which is the junction of the two loops as well as the inlet and outlet ends, such anchoring strongly inhibits deflection of the loops. As a result, velocity sensors of the type used in the prior art are not sufficiently sensitive to provide an adequate signal for mass flow measurement.

To overcome this drawback, the Herzl U.S. Pat. No. 4,747,312 discloses a mass flowmeter of the Coriolis type in which the fluid to be metered is conducted through a pipe which is coiled to form a double loop. The pipe is anchored on a stationary frame at its inlet and outlet ends and also at its center which is the junction of the two loops to define a tuning fork in which the identical loops on either side of the anchored center function as tines that are free to vibrate as well as to twist.

An electromagnetic driver mounted at the vertex of the double loop is electrically energized to cause the loops to vibrate, in phase opposition, at the natural frequency of the tuning fork. The fluid passing through the double loop is subjected to Coriolis forces, thereby causing the vibrating loops to torsionally oscillate in accordance with the mass flow of the fluid. Capacitance sensors are symmetrically mounted on the respective loops to yield signals having a difference in magnitude and phase that depends on the amplitude of the torsional oscillations, these signals being applied to a differential amplifier whose output is proportional to the mass flow of the fluid.

The Herzl double-loop meter exhibits serious defects in meter performance. In the Herzl meter, the double loop is supported on a stationary frame in which the double loop is anchored at three points; namely, at its inlet and outlet end and also at the junction of the two loops forming the double loop. The double loop is therefore highly sensitive to forces from external sources that may give rise to vibration of the frame or produce torsional or bending moments.

SUMMARY OF INVENTION

In view of the foregoing, the main object of this invention is to provide a Coriolis-type mass flowmeter of the double-loop type which operates efficiently, reliably and accurately.

More particularly, an object of this invention is to provide a mass flowmeter of the above type which makes use of a double loop that functions as a tuning fork and is excited into vibration at its natural resonance frequency, the double loop being joined at three points to a rigid bar which is free to float relative to the support structure for the meter, thereby effectively isolating the double loop from external forces.

Also an object of the invention is to provide a meter of the above type in which the helically coiled flow tube defines not only a double loop but also an isolation loop on either side of the double loop which functions as a spring to isolate the bar and the double loop from external forces.

A significant advantage of the invention is that the meter is insensitive to torsional, vibrational and bending forces from external sources applied to the support structures therefor, and therefore affords accurate mass flow readings under adverse operating conditions.

Also an object of the invention is to provide a flowmeter of the above type in which the double loop and the isolating loops are defined by a single length of tubing without joints. This makes possible practical applications where joints, crevices or a second wetted material are interdicted.

Yet another object of the invention is to provide a mass flowmeter of the Coriolis-type in which the helix which defines the double loop and the isolation loops on either side of the double loop has an isolation loop input and an isolation loop output that both extend along the longitudinal axis of the helix, thereby reducing the effect of external forces on the calibration of the meter and rendering the meter self-draining when mounted in a vertical pipeline.

Briefly stated, these objects are attained in a mass flowmeter of the Coriolis-type in which fluid to be metered is conducted through a flow tube which is coiled to define a helix having a pair of identical measuring loops forming a double loop, on either side of which is an isolation loop. The fluid is admitted into the input of one isolation loop and is discharged from the output of the other isolation loop. The helix is concentric with a support structure having at one end a flow inlet to which the isolation loop input is affixed, and at the other end a flow outlet to which the isolation loop output is attached.

A rigid bar parallel to the axis of the helix is joined to the junction of the measuring loops as well as to the respective junctions of each measuring loop and its associated isolation loop whereby the isolation loops then function as springs to effectively isolate the bar and the double loop from external forces. The measuring loops act as the tines of a tuning fork and are excited to vibrate in phase opposition. The fluid passing through the double loop is subjected to Coriolis forces, thereby causing the vibrating loops to torsionally oscillate in accordance with the mass flow of the fluid. Sensors mounted on the oscillating loops yield signals having a difference in magnitude and phase that is a function of the torsional oscillations. These signals are applied to a differential amplifier whose output is proportional to the mass flow of the fluid.

BRIEF DESCRIPTION OF DRAWINGS

For a better understanding of the invention as well as other objects and further features thereof, reference is made to the following detailed description to be read in conjunction with the accompanying drawings, wherein.

DETAILED DESCRIPTION OF INVENTION

Figure 1:
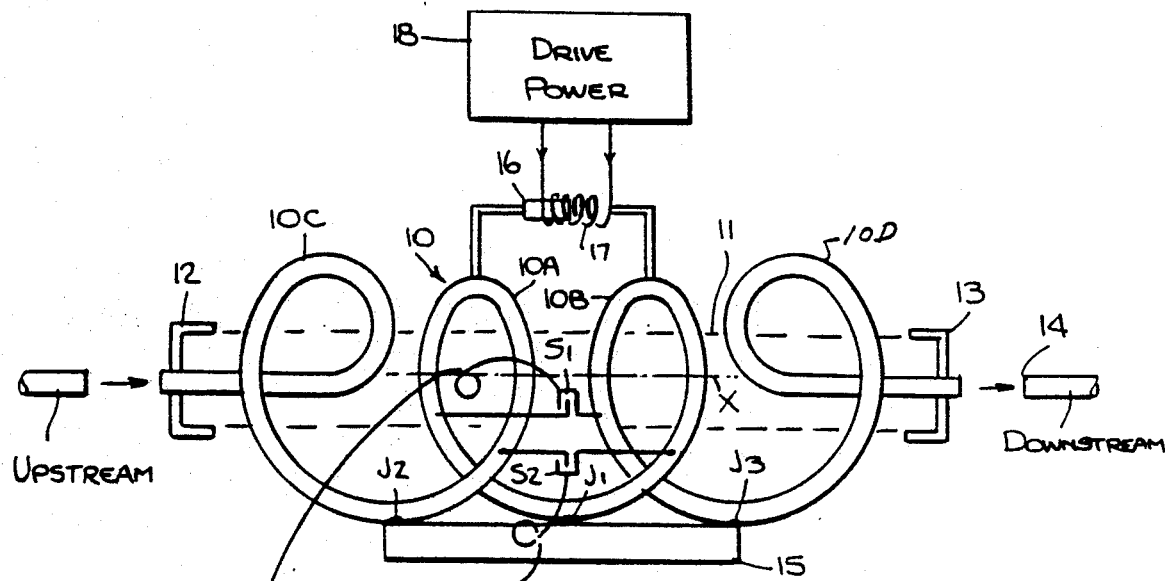
FIG. 1 schematically illustrates a Coriolis-type mass flowmeter in accordance with the invention and the electronic secondary associated therewith coupled to the sensors of the flowmeter.

Referring now to FIG. 1, there is shown a mass flowmeter of the Coriolis-type according to the invention which includes a flow tube, generally designated by numeral 10, formed of a single length of stainless steel tubing or other material that is non-reactive to the fluid being metered and is capable of withstanding the pressure of the fluid.

Tube 10 is coiled into a helix constituted by a series of loops, the pair of adjacent identical measuring loops 10A and 10B in the helix creating a double loop, on either side of which are isolation loops 10C and 10D.

The helix is concentric with a cylindrical support structure 11 having at one end a flow inlet 12 and at the other end a flow outlet 13. Affixed by welding or other means to flow inlet 12 is the input to isolation loop 10C of the flow tube into which the fluid to be metered is admitted, and affixed to flow outlet 13 is the output of isolation loop 10D from which the fluid is discharged. Thus the input and output of the helix are colinear with and extend along its longitudinal center line axis X. This permits the helical flow tube to be self-draining when the flowmeter is interposed in a pipeline 14 which is vertical, rather than horizontal, as shown.

While mass flow may be measured in either flow direction, for purposes of illustration, the left end of flow tube 10 is treated as the flow input to be coupled to the upstream side of pipeline 14, and the right end of the flow tube is treated as the flow output to be coupled to the downstream side of the pipeline.

The junction $J_1$ of measuring loops 10A and 10B which form the double loop is joined to the midpoint of a rigid bar 15 which is parallel to the longitudinal axis X of the helix. The junction $J_2$ of measuring loop 10A and isolation loop 10C associated therewith is joined to one end of bar 15, while the junction $J_3$ of measuring loop 10B and its associated isolation loop 10D is joined to the other end of this bar. Thus the double loop is connected at its three junction points to bar 15 which is resiliently supported by the isolation loops and is therefore free to float relative to support structure 11.

The double loop 10A–10B configuration in which its three junction points are connected to rigid bar 15 functions effectively as a tuning fork whose tines are constituted by the identical measuring loops. These tines are caused to vibrate in phase opposition at the natural resonance frequency of the fork. When fluid flows through the vibrating measuring loops, loops 10A and 10B are then subjected to opposing Coriolis force torques, and are concurrently caused to twist alternately toward and away from each other. Hence the loops not only vibrate in phase opposition, but they also oscillate torsionally in opposing directions.

The measuring loops are driven to vibrate as the tines of a tuning fork by an electromagnetic driver formed by a permanent magnet 16 attached to the vertex of loop 10A and a cooperating coil 17 attached to the vertex of loop 10B. Coil 17 is excited by a drive power source 18 to cause the magnet to be alternately attracted to the coil and repelled thereby at a rate corresponding to the natural resonance frequency of the fork, thereby causing loops 10A and 10B to swing back and forth in phase opposition.

Two capacitance sensors $S_1$ and $S_2$ are mounted on measuring loops 10A and 10B of the double loop. The structure and function of these sensors and their placement on the loops may correspond to the sensor arrangement in the Herzl U.S. Pat. No. 4,747,312. However, the invention is not limited to such sensors, and other known sensors used in conjunction with tuning-fork loop arrangements in Coriolis-type mass flowmeters may be used including strain gauge sensors, to sense the torsional oscillations of the vibrating double loop.

Inasmuch as each loop vibrates back and forth and oscillates torsionally, the spacing between the plates of the capacitance sensor varies to an extent determined by the vector resultant of the vibratory and torsional movements. The change in capacitance experienced by each sensor is converted into a corresponding voltage signal by connecting the capacitor to a direct-current voltage source in series with a current limiting resistor, in a manner to be later explained.

The signal voltage from sensor $S_1$ is applied to a preamplifier 21 and from sensor $S_2$ to a preamplifier 20. The output of preamplifier 21 is connected to the negative input of a differential amplifier 22 through a fixed resistor 23 in series with a variable gain-control resistor 24. The output of preamplifier 20 is connected to the positive input of differential amplifier 22 through a fixed resistor 25. The output of differential amplifier 22 which represents the difference between the amplitudes of the sensor signals is applied to a microprocessor 26.

The output of preamplifier 21 is also applied through a fixed resistor 27 to the input of a summing amplifier 28 to which is also applied through a fixed resistor 29 the output of preamplifier 20. Hence the output of summing amplifier 28 is the sum of the sensor signals, and this is applied to another input of microprocessor 26.

Microprocessor 26 on the basis of the sum and difference signal data entered therein, calculates the mass flow rate of fluid flowing through the flow loop to provide a digital value representing the mass flow rate. This is displayed on visual indicator 30.

Figure 2:
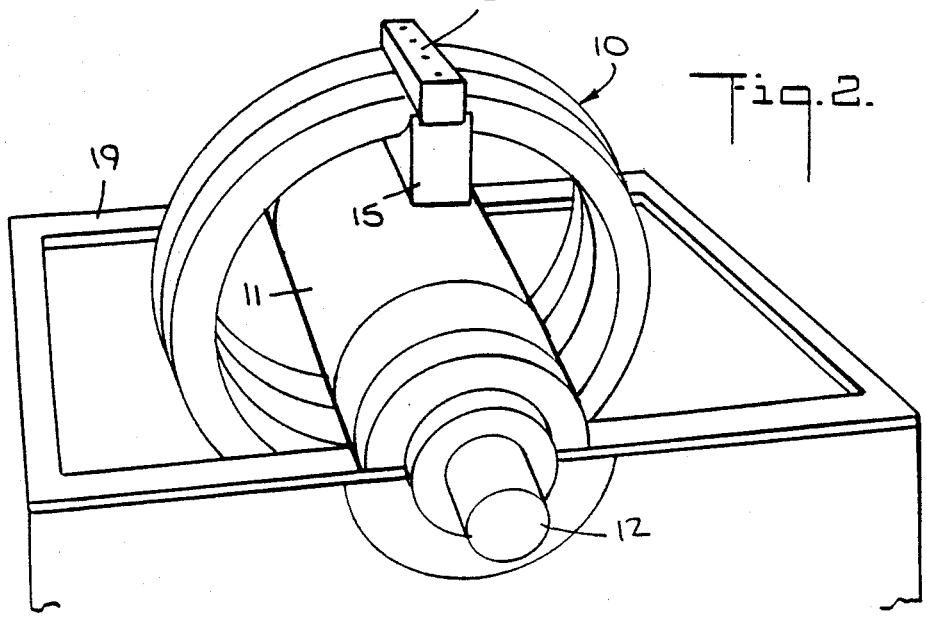
FIG. 2 is a perspective view of an actual embodiment of the mass flowmeter, the sensors and the electromagnetic driver being omitted.
Figure 3:
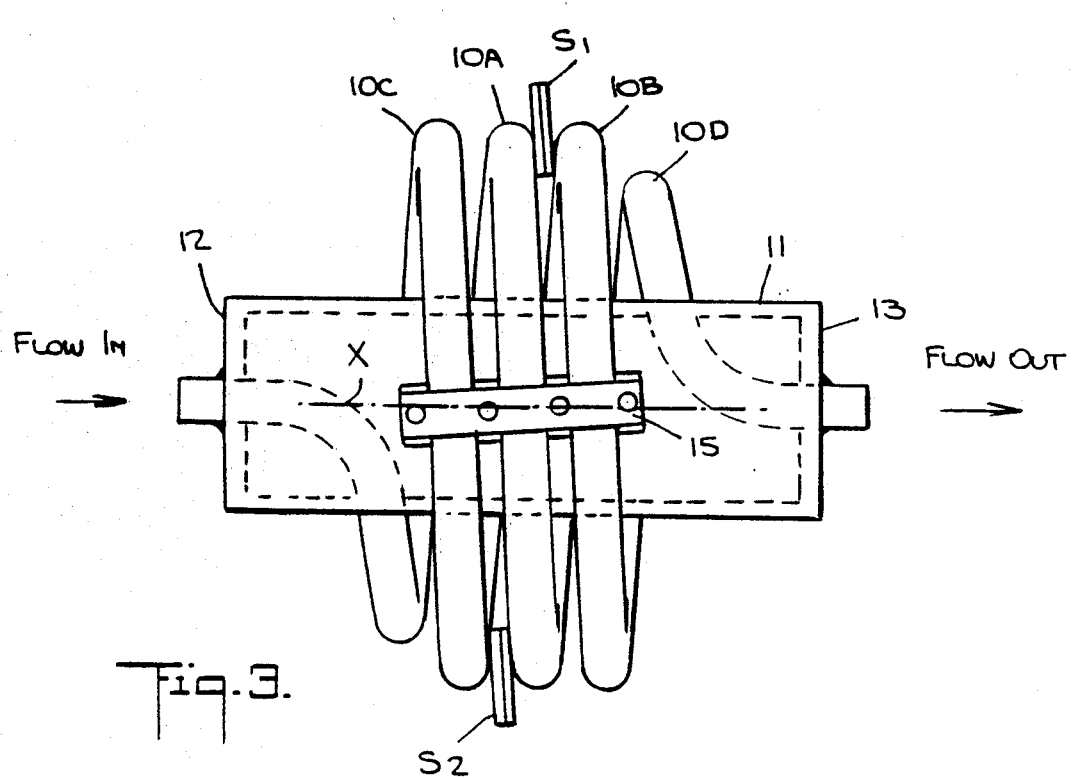
FIG. 3 is an elevational view of the helical flow tube of the flowmeter.
Figure 4:
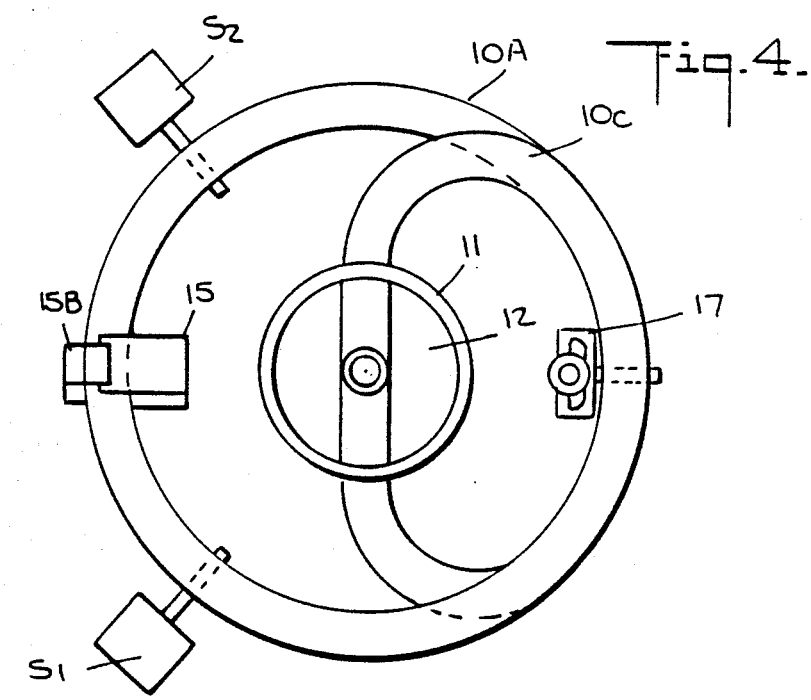
FIG. 4 is an end view of the flow tube.

As shown in FIGS. 2, 3 and 4, in a practical embodiment of the invention, rigid bar 15 is joined at the three junction points by clamping rigid bar 15 thereto by means of a clamping strip 15B which is screwed onto the bar, the bar having notches therein to accommodate the tubing.

It will be seen in FIG. 2 that the ends of the cylindrical support structure 11 are secured to the opposing side walls of a box-like case 19 to enclose the helix within the box. The box is preferably light-weight, for its main purpose is to protect the meter from harsh environmental conditions. Only the lower half section of the case is shown.

Rigid bar 15 which is joined to junction points $J_1$, $J_2$ and $J_3$ of the double loop 10A–10B (junction $J_1$ being the midpoint, junction $J_2$ being the upstream point and junction $J_3$ being the downstream point) is elastically connected to the ends of the cylindrical support structure 11 by isolation loops 10C and 10D which are integral extensions of the associated measuring loops and behave as decoupling springs to isolate the bar and the measuring loops from external forces.

The isolation loops are adapted to take no energy from the flowmeter structure or the user's pipeline structure. And the isolation loops are designed to have a stiffness which is a function of the mass of the floating assembly and the frequencies and accelerations applied by both internal and external vibrations. These isolation loops afford positional transition from the ends of the measuring loops 10A and 10B to the installation connections.

The three junction points which are rigidly connected to each other by bar 15 are permitted to float freely in a frictionless manner relative to the meter support structure. This condition, together with the positioning of the installation centerline coincident with the loop centerline renders the meter insensitive to torsional, vibrational and bending forces applied to the support structure.

While there has been shown and described a preferred embodiment of an improved Coriolis-type flowmeter in accordance with the invention, it will be appreciated that many changes and modifications may be made therein without, however departing from the essential spirit thereof.

We claim:
1. A mass flowmeter of the Coriolis-type comprising:
   (a) a flow tube helically coiled to define a helix having a pair of adjacent identical measuring loops forming a double loop, on either side of which is an isolation loop;
   (b) a support structure coaxial with the helix having at one end a flow inlet to which is affixed an input to one of said isolation loops to which a fluid to be metered is admitted, and having at its other end a flow outlet to which is affixed an output from the other isolation loop from which the fluid is discharged;
   (c) a rigid bar joined to the junction of the measuring loops as well as to the respective junctions of each measuring loop and its associated isolation loop whereby the isolation loops then behave as decoupling springs to effectively isolate the bar and the double loop from external forces;
   (d) means to excite the measuring loops to cause them to vibrate in phase opposition as the tines of a tuning fork, the fluid passing through these loops being subjected to Coriolis forces causing the vibrating loops to torsionally oscillate; and
   (e) means to sense the torsional oscillations to produce signals indicative of the mass flow of the signal.

2. A mass flowmeter as set forth in claim 1, wherein said helix is formed from a single length of metal tubing.

3. A mass flowmeter as set forth in claim 2, wherein said tubing is formed of stainless steel.

4. A mass flowmeter as set forth in claim 1, wherein said rigid bar is clamped at its midpoint to the junction of the measuring loops and at its ends to said respective junctions.

5. A mass flowmeter as set forth in claim 1, wherein said support structure is a cylinder.

6. A mass flowmeter as set forth in claim 5, wherein said cylinder is attached at its ends to opposing side walls of a box-like case for housing the meter.

7. A mass flowmeter as set forth in claim 1, wherein said means to excite said tuning fork is formed by an electromagnetic driver having a permanent magnet attached to one of the measuring loops at its vertex and a cooperating coil attached to the other measuring loop at its vertex.

8. A mass flowmeter as set forth in claim 7, further including a drive power source to excite said coil periodically to cause said tuning fork to vibrate at its natural resonance frequency.

9. A mass flowmeter as set forth in claim-1, wherein said means to sense the torsional oscillations are capacitance sensors which yield signals having a difference in magnitude and phase that is a function of the torsional oscillations.

10. A mass flowmeter as set forth in claim 9, wherein said signals are applied to a differential amplifier whose output is proportional to the mass flow of the fluid.

11. A mass flowmeter as set forth in claim 1, wherein said isolation loop input and said isolation loop output are colinear with the axis of the helix.

* * * * *